United States Patent [19]

Poss

[11] Patent Number: 6,005,730
[45] Date of Patent: Dec. 21, 1999

[54] SIGNAL ERROR GENERATING CIRCUIT FOR AN ANALOG SIGNAL PROCESSING CHANNEL

[75] Inventor: Joe Martin Poss, Rochester, Minn.

[73] Assignee: International Business Machines Corporation, Armonk, N.Y.

[21] Appl. No.: 08/891,489

[22] Filed: Jul. 11, 1997

[51] Int. Cl.[6] ....................................................... G11B 5/09
[52] U.S. Cl. .............................................. 360/51; 360/46
[58] Field of Search .................................. 360/51, 39, 55, 360/46; 341/155, 163

[56] References Cited

U.S. PATENT DOCUMENTS

4,970,609  11/1990  Cunningham et al. .................... 360/51

*Primary Examiner*—W. Chris Kim
*Assistant Examiner*—Dan I. Davidson
*Attorney, Agent, or Firm*—Joan Pennington; Philip M. Kolehmainen

[57] ABSTRACT

A Class IV Partial Response Maximum Likelihood data channel for analog signal processing of a disk drive signal in tracking mode includes a signal error generating circuit for "folding" the analog disk drive signal around the three PR-IV target values of +1, −1 and 0. Using the smaller error signal rather than the larger analog disk drive signal by which the disk drive signal deviates from the target values results in significant power saving with no reduction in electronic signal to noise ratio. An integrated error generating circuit generates both a gain error signal and a timing error signal from the folded error signal for feedback control of the data channel variable gain amplifier and variable clock oscillator. Shared processing of the timing and gain error signals results in power savings and simpler circuitry.

8 Claims, 12 Drawing Sheets

PRIOR ART

SIGNAL ERROR GENERATING CIRCUIT FOR AN ANALOG SIGNAL PROCESSING CHANNEL

FIELD OF THE INVENTION

The present invention relates to analog signal processing, and more particularly to an improved signal processing apparatus having reduced processing power requirements.

DESCRIPTION OF THE RELATED ART

Analog signal processing circuits such as those used to process analog signals read by disk drive transducer heads from magnetic disks typically use feedback or decision aided gain and timing control to control tracking of the recorded data. Known Partial Response Maximum Likelihood Type IV channels employ a variable gain amplifier in the channel for amplification of the analog disk signal and a variable clock oscillator for controlling the synchronization of the analog disk signal sampling. In order to maintain accurate signal tracking of the channel in tracking mode, a gain error signal is developed from the analog disk signal to control the amplifier gain, and a timing error signal is developed from the analog disk signal to control the oscillator frequency.

Known signal processing systems for disk drive channel tracking control have a gain error circuit for developing the gain error signal from the analog disk signal and a discrete timing error circuit for developing the timing error signal from the analog disk signal. Known signal processing circuits also typically may include detection circuitry separate from the error circuits for developing an idealized digital target value signal from the amplified and equalized signal provided in the data channel. Typical timing and gain error circuits directly process the analog disk signal.

The known signal processing systems are subject to problems. Because the analog disk signal is relatively large, the power requirement for processing the signal is undesireably large. Also the use of two separate error circuits for developing gain and timing error signals results in excessive power use and in undesirable circuit complexity.

SUMMARY OF THE INVENTION

A principal object of the present invention is to provide an analog signal processing apparatus for magnetic disk signals or other analog signals in which the power requirements are reduced. Other objects are to provide improved analog signal processing apparatus in which the signal processed to develop an error signal is smaller in amplitude than the analog input signal; to provide an analog signal processing apparatus using a relatively small amplitude analog signal for error signal processing with no reduction in electronic signal to noise ratio; and to overcome problems that have existed in known analog signal processing systems for disk drive signal tracking and the like.

In brief, in accordance with the present invention, there is provided a signal error generating circuit for use in a data channel for processing an analog input signal approximating a series of discrete target values. The signal error generating circuit includes an input connected to receive the analog input signal. A voltage shifting circuit is connected to the input for providing a plurality of shifted analog voltages by adding the discrete target values to the analog input signal. A sampling circuit periodically samples the shifted analog voltages and then holds the resulting values. A detector circuit periodically develops from the analog input signal a representation of the the target value most closely approximated by the analog input signal. A control circuit selects from the sampling circuit the shifted analog voltage corresponding to the approximated target value and develops an output error signal equal to the deviation of the selected shifted analog voltage from the approximated target value.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
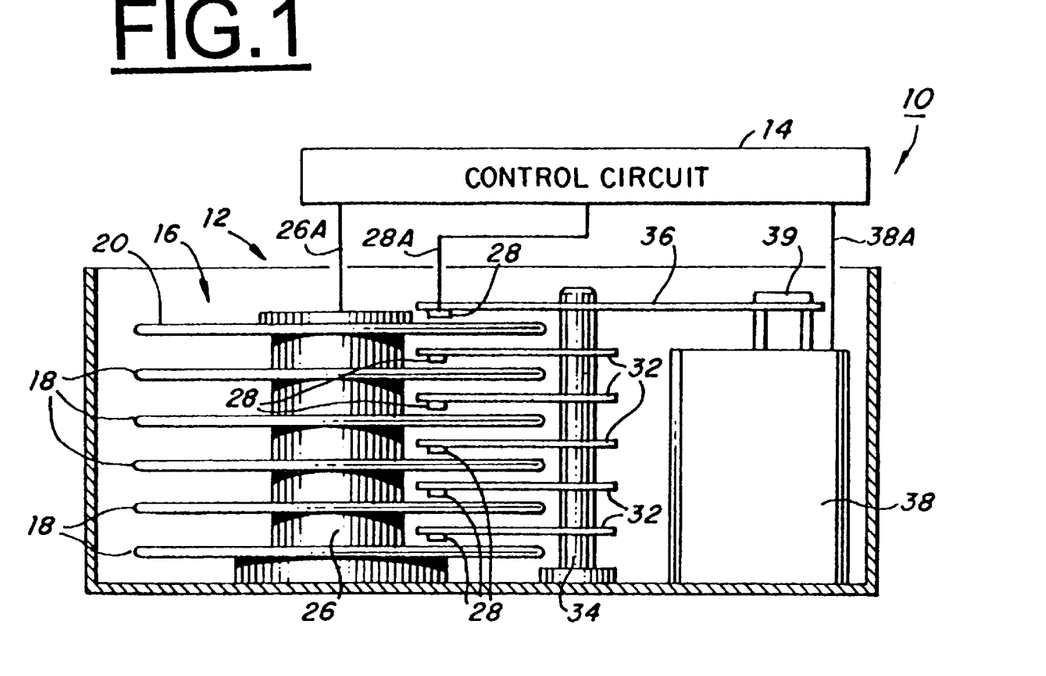
FIG. 1 is a schematic and block diagram of a data storage disk file embodying the present invention.

Having reference now to the drawings, FIG. 1 is a simplified, partly schematic illustration of a data storage disk file 10 including a data storage medium generally designated as 12 and an interface control unit generally designated as 14. In the preferred embodiment of the invention, the data storage medium 12 is a rigid magnetic disk drive unit 12, although other media could be used. The disk drive unit 12 is illustrated in simplified form sufficient for an understanding of the present invention, in view of the fact that the present invention has utility with a wide variety of drive units.

Figure 2:
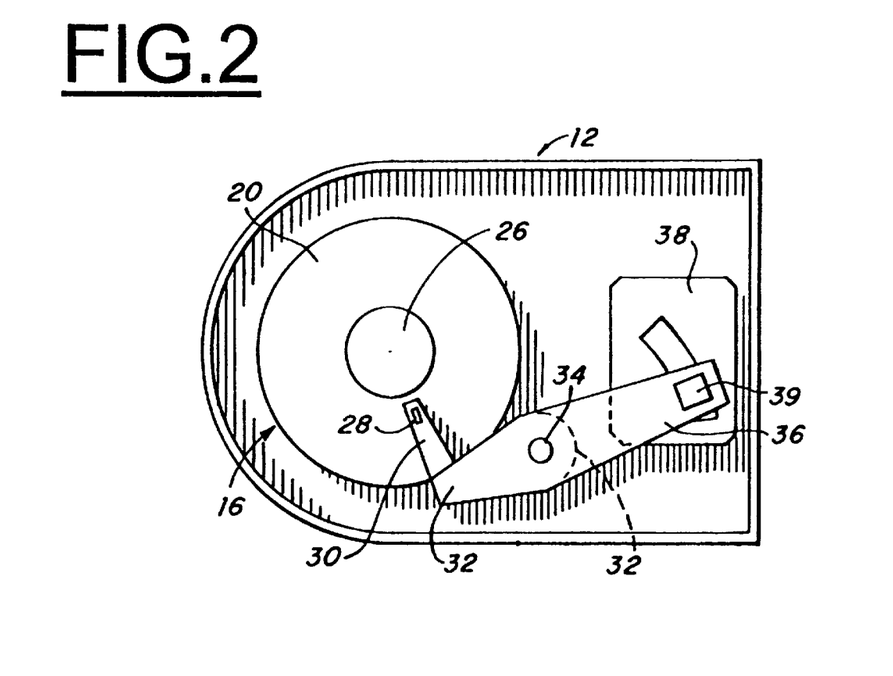
FIG. 2 is a diagram showing the data accessing mechanism for a single disk surface of the apparatus of FIG. 1.

Referring now to FIGS. 1 and 2 of the drawings, the disk drive unit 12 includes a stack 16 of disks 18 each having at least one magnetic disk surface 20. The disks 18 are mounted parallel to one another for simultaneous rotation on and by an integrated spindle and motor assembly 26. Data is written to or read from each disk surface 20 of each disk 18 by a corresponding transducer or read/write head 28 movable across the rotating disk surface 20. A head 28 is provided for each surface 20. For simplicity, each disk 18 is shown with a single data surface 20 and a single corresponding head 28. In practice, each disk 18 may have two opposed data surfaces 20, each with a corresponding head 28.

Transducer heads 28 are mounted on flexure springs 30 carried by arms 32 ganged together for simultaneous pivotal movement about a common axis provided by a support spindle 34. One of the arms 34 includes an extension 36 driven in a pivotal motion by a head drive motor 38. Although several different drive systems are possible, the motor 38 is illustrated as a voice coil type motor with a coil 39 cooperating with a magnet and core assembly (not seen) controlled for moving the transducer heads 28 in synchronism along radial paths over the magnetic disk surfaces 20. As the coil 39 moves through a fixed magnetic field, the direction and velocity of its movement is controlled by current supplied to the coil 39. The components of the disk file 10 are controlled in operation by signals supplied by the control unit 14, including spindle motor control signals on line 26A and head position control signals on line 38A.

In a typical data storage disk file arrangement, data is written to or recorded upon the disk surfaces 20. The recorded data may include synchronization information provided on one or more disk surfaces that may be read by one or more heads 28. In an acquisition mode, the synchronization data is read and used to lock the heads 28 in accurate synchronization with the data recorded on the surfaces 20. When the heads 28 are locked in correct synchronization, then other data, known as customer data, can be written onto or read from the surfaces 20 in regions other than those containing synchronization data. When previously written customer data is read from the surfaces 20, the system is operated in a tracking mode following the acquisition mode. The present invention provides important advantages in the processing of data received from a transducer head 28 operating in the tracking mode.

The reading of data by the heads 28 from the magnetic disk surfaces 20 is one example of a data communication system where it is necessary to process an analog signal in order to accurately determine the signal information content. Although many systems can be employed to process such data, one approach that is widely used in reading magnetic recorded data is Partial Response Maximum Likelihood data processing (PRML). Although the present invention is described in connection with a PRML magnetic data processing channel incorporated into the control unit 14, it should be understood that principles of the invention may be used with communication signal processing systems of many different kinds.

Figure 3:
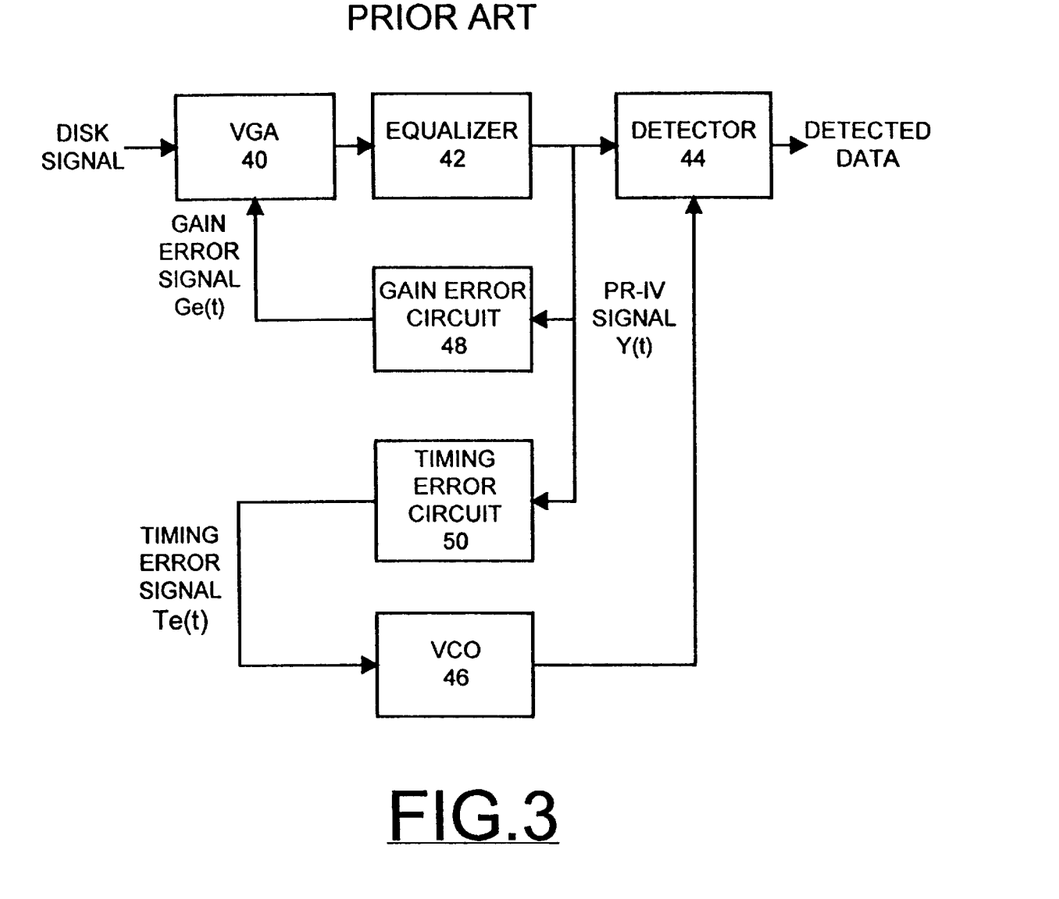
FIG. 3 is a block diagram of a typical prior art Type IV Partial Response Maximum Likelihood (PRML-IV) read data channel.

FIG. 3 is block diagram of a typical Type IV PRML data read channel. The disk signal read from a disk surface 20 by a head 28 is supplied to a variable gain amplifier (VGA) 40. The amplified signal is processed by a filter or equalizer 42 and the equalized signal Y(t) is provided to a detector 44 and detected by one of many methods such as, for example, maximum likelihood detection using the Viterbi algorithm.

The PR-IV signal Y(t) has three target values of +1, −1 and zero. In order for the detector 44 to accurately discriminate between these values, the timing of the detector 44 is maintained by a variable clock oscillator (VCO) 46 in synchronization with the timing of signal variations within the equalized signal Y(t) and the gain of the VGA 40 is controlled to regulate the magnitude of the equalized signal. In the known signal processing system of FIG. 3, the gain of the VGA 40 is controlled by a gain error signal Ge(t) provided by a gain error circuit 48 and the timing of the VCO 46 is controlled by a timing error signal Te(t) provided by a timing error circuit 50. The error circuits 48 and 50 derive the error signals from the signal Y(t) to provide feedback or decision aided gain and timing control.

The known processing system of FIG. 3 has disadvantages. In tracking mode the signal Y(t) is relatively large in comparison with the amount by which it differs from the three target values. Because the timing and gain error signals are processed independently of one another, and because the relatively large signal Y(t) is processed directly, the known system requires an undesireably large amount of signal processing power.

Figure 4:
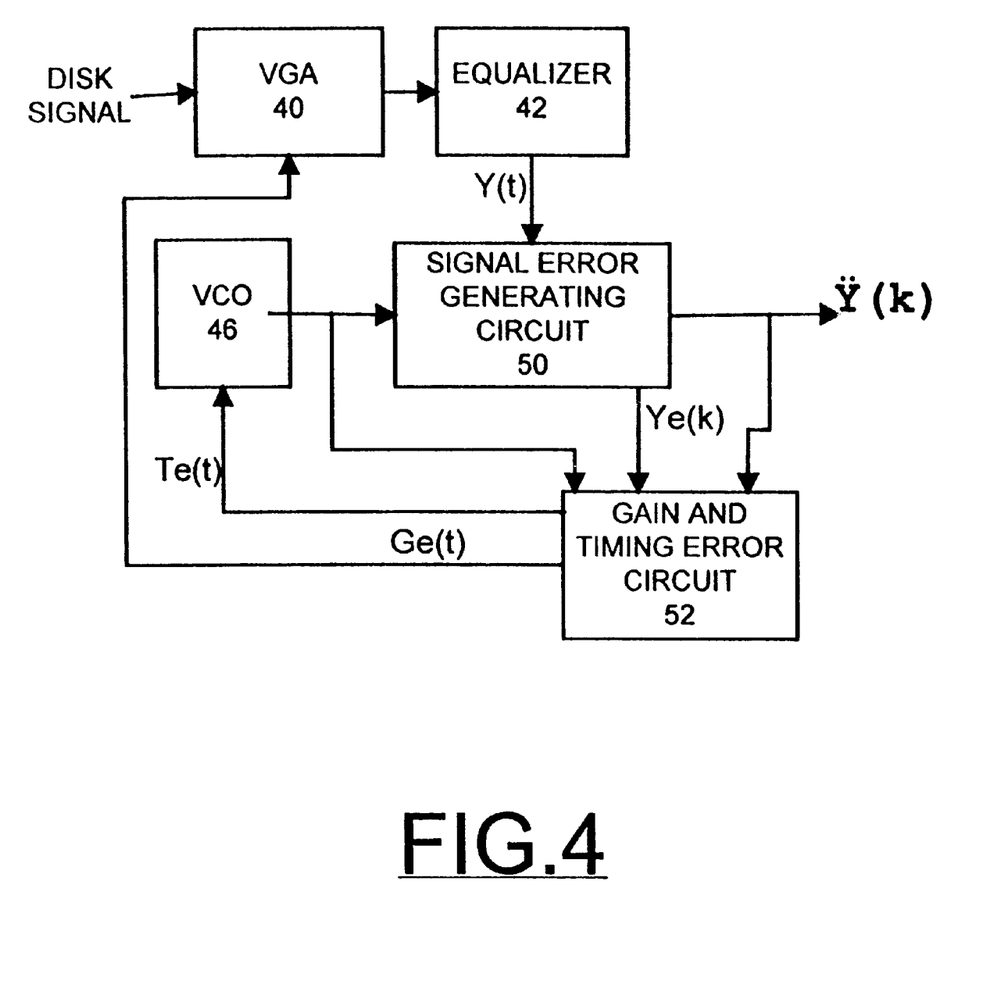
FIG. 4 is a block diagram of a read data channel signal processing system embodying the present invention.

FIG. 4 is an illustration of a signal processing system embodying the present invention. The system may be incorporated into the control unit 14 of the data storage disk file 10. The disk signal read by a head 28 from a magnetic disk surface 20 is provided to the VGA 40 and equalizer 42 to provide the equalized signal Y(t). This signal Y(t) is provided to a signal error generating circuit 50 also seen in detail in FIG. 5. The circuit 50 receives clock timing signals from the VCO 46 and processes the input signal Y(t) to provide both an error signal Ye(k) and an idealized PRML-IV detected output signal $\ddot{Y}(k)$ having a two bit digital value of 0, +1 or −1 at time k. These signals are provided to an integrated gain and timing error circuit 52 in which both the timing and gain error signals are processed together by sharing information using analog sampling techniques. The gain and timing error circuit 52, also seen in detail in FIG. 6, provides the gain error signal Ge(t) for feedback control of the VGA 40 and the timing error signal Te(t) for feedback control of the VCO 46.

Figure 5:
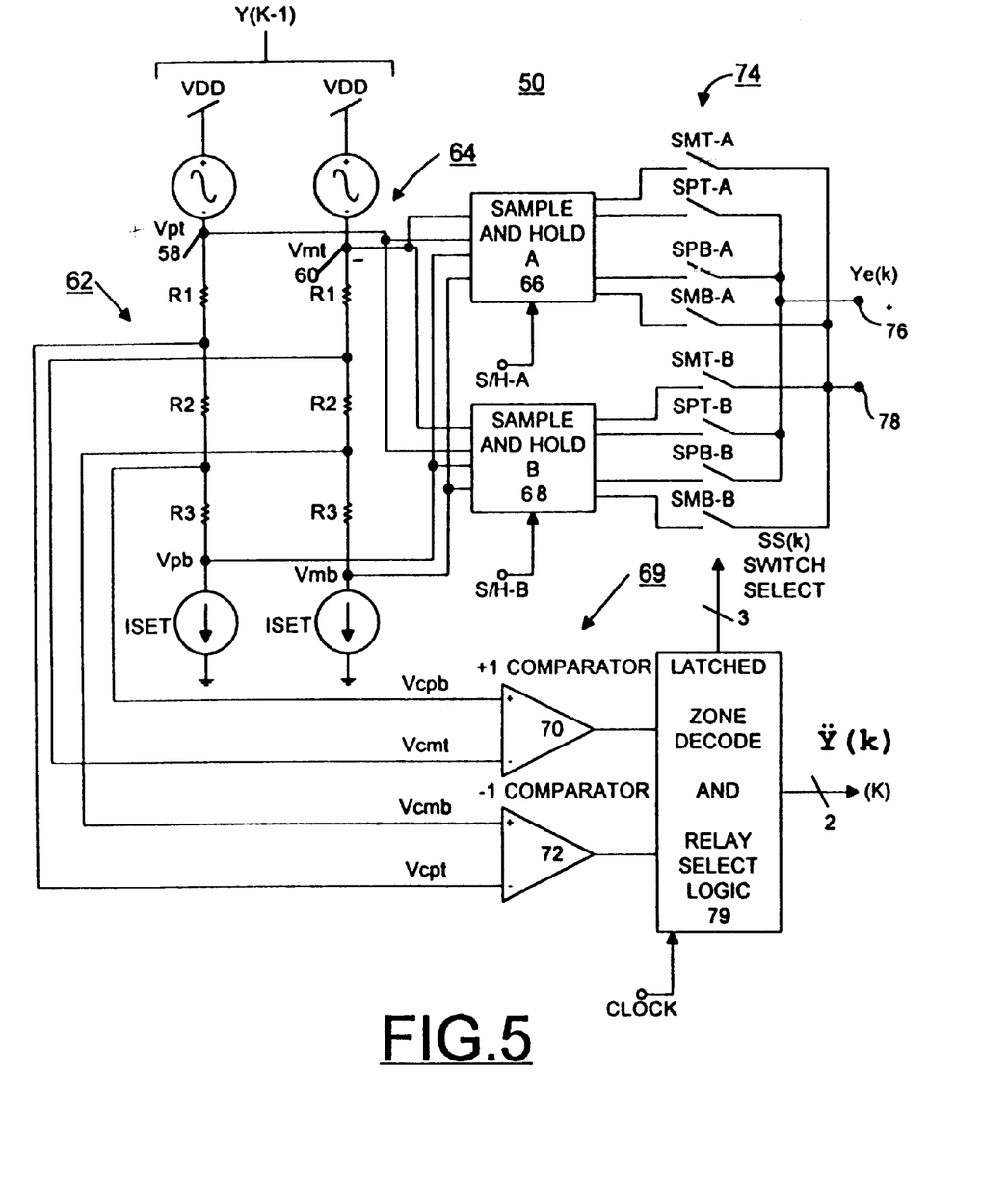
FIG. 5 is a schematic diagram of the signal error generating circuit of the system of FIG. 4.
Figure 6:
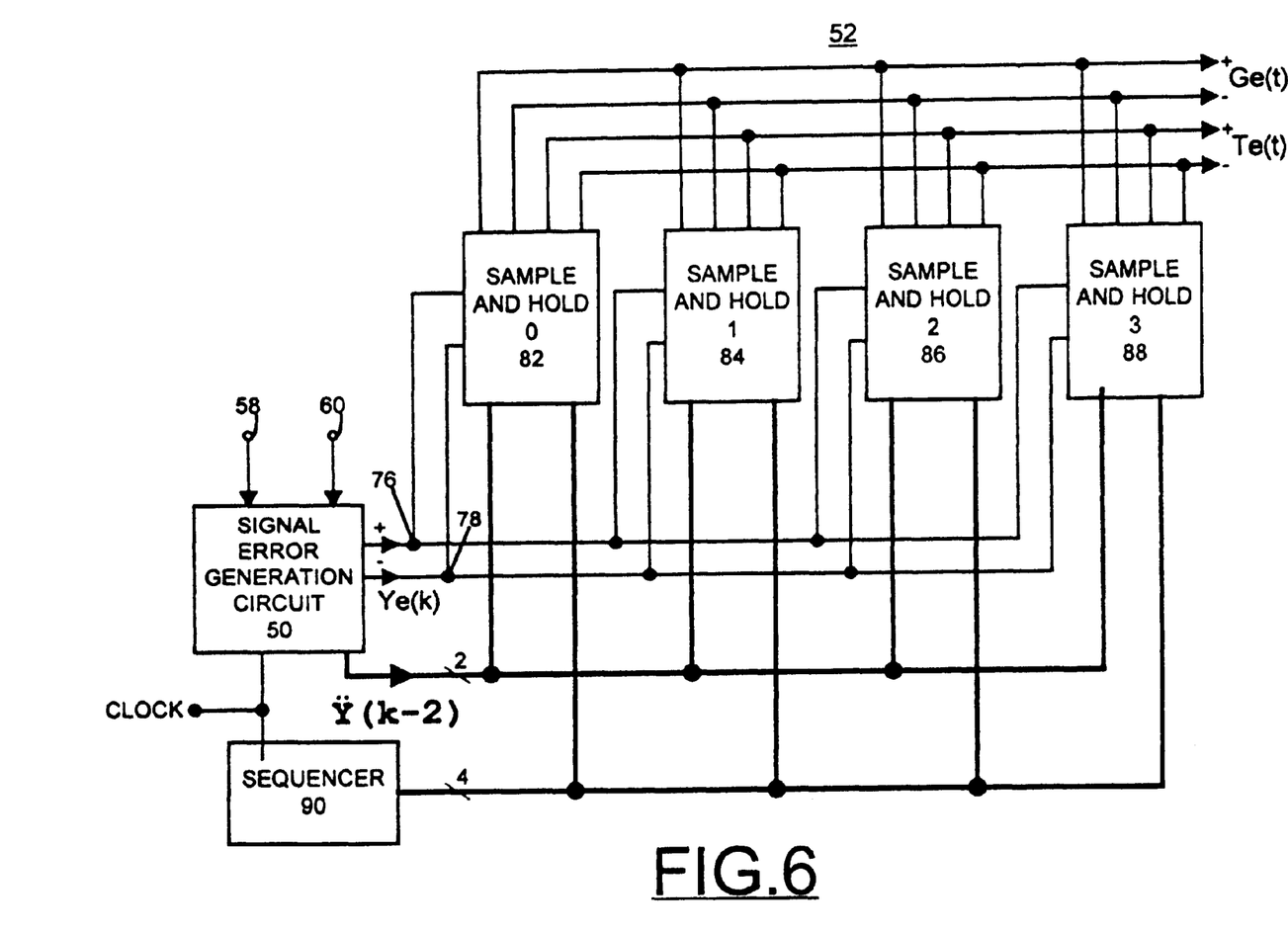
FIG. 6 is a schematic diagram of the gain and timing error circuit of the system of FIG. 4.
Figure 7:
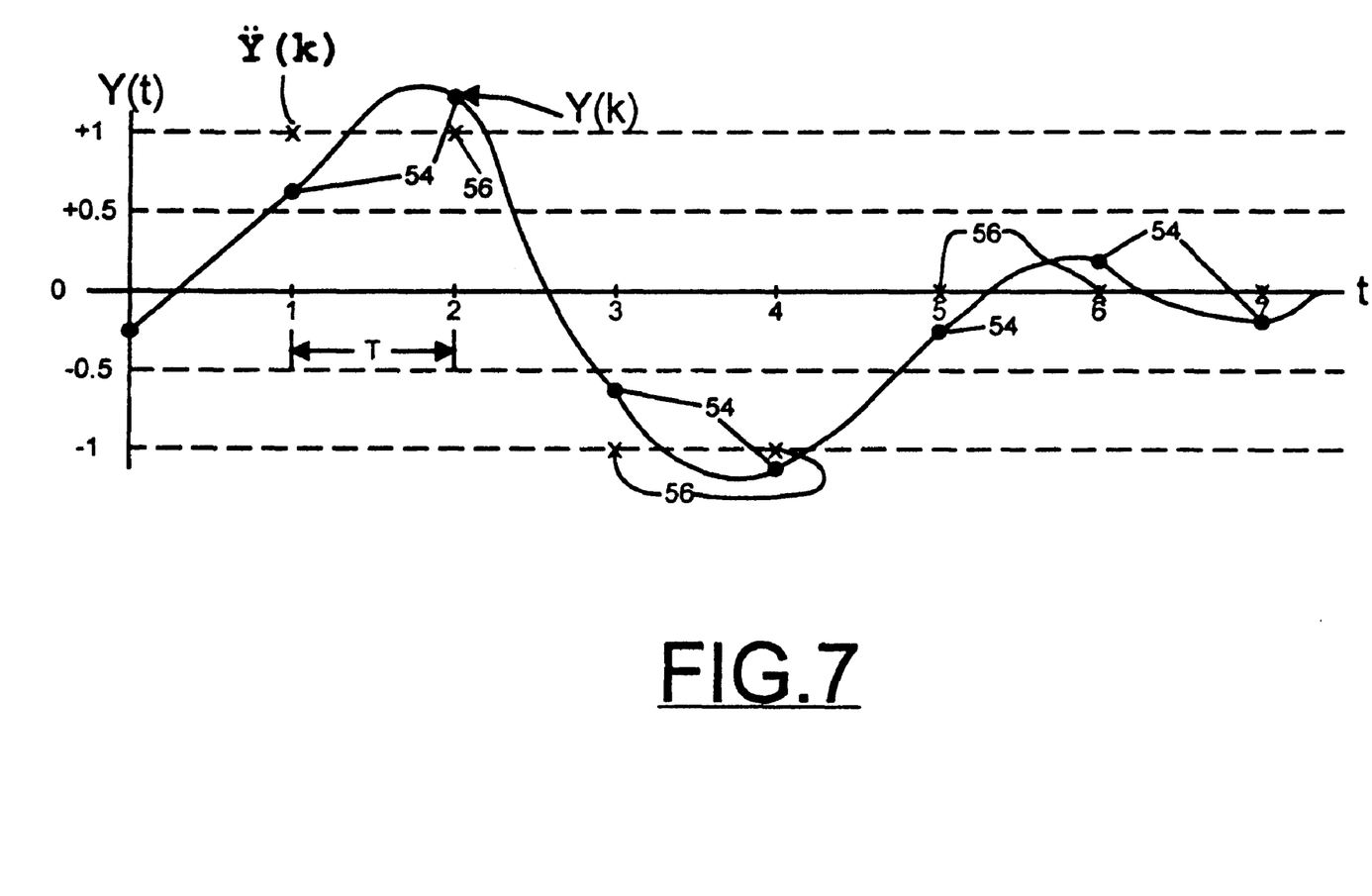
FIG. 7 is a graph showing an analog ac class IV partial response signal sampled at regular time intervals, together with the corresponding ideal target value for each sample instance.

The signal error generating circuit 50 of FIGS. 4 and 5 processes the analog signal Y(t) using a minimum amount of power by reducing the processed signal amplitude without reducing the electronic signal to noise ratio. With the PR-IV signal of the preferred embodiment, the signal is "folded" around the specific target values of +1, −1 and 0. FIG. 7 illustrates the waveform of the analog signal Y(t) with magnitude of the signal along the vertical axis and time along the horizontal axis. The analog signal is sampled at regular periods spaced by time "T". The sample instances are designated as 0, 1, 2, . . . 7 on the time axis. The sampled values of Y(t) are shown as dots 54 in FIG. 7 and are designated as Y(k) where k equals nT and n=0, 1, 2, 3, . . . .

Rather than processing the relatively large sampled values Y(k), the circuit 50 instead processes relatively smaller error values designated as Ye(k). The error values are the amounts by which the sampled values Y(k) differ from the target values $\ddot{Y}(k)$. The target values $\ddot{Y}(k)$ are shown by the points marked "x" and designated as 56 in FIG. 7. Each of these points in the PR-IV signal has a target value of +1, −1 or 0. The target value for each sampled value Y(k) is determined as shown in the following table 1:

TABLE 1

| |
| --- |
| $\ddot{Y}(k) = +1$ if $Y(k) \geq 0.5$ |
| $\ddot{Y}(k) = 0$ if $-0.5 < Y(k) < 0.5$ |
| $\ddot{Y}(k) = -1$ if $Y(k) \leq -0.5$ |

The error signal is the difference between the target value $\ddot{Y}(k)$ and the sampled value Y(k). Thus Ye(k) is equal to Y(k) minus $\ddot{Y}(k)$. For the three discrete values of $\ddot{Y}(k)$, the value of Ye(k) can alternatively be expressed as in table 2:

TABLE 2

Ye (k) = Y (k) + 1 if Ÿ (k) = −1
Ye (k) = Y (k) if Ÿ (k) = 0
Ye (k) = Y (k) −1 if Ÿ (k) = +1

The following table 3 provides a specific numerical example of the target values Ÿ(k), the sampled values Y(k) and the error values Ye(k) as seen in the graph of FIG. 7:

TABLE 3

| k | 0 | 1 | 2 | 3 | 4 | 5 | 6 | 7 |
|---|---|---|---|---|---|---|---|---|
| Ÿ (k) | 0 | +1 | +1 | −1 | −1 | 0 | 0 | 0 |
| Y (k) | −0.2 | +0.7 | +1.2 | −0.7 | −1.05 | −0.25 | +0.2 | −0.15 |
| Ye (k) | −0.2 | −0.3 | +0.2 | +0.3 | −0.05 | −0.25 | +0.2 | −0.15 |

Processing the relatively smaller error signal Ye(k) rather than the relatively larger sampled signal Y(k) reduces the amount of power needed to process the signal by a factor of three.

The signal error generating circuit 50 of FIGS. 4 and 5 generates the error signal Ye(k) and the target value signal Ÿ(k) from the input signal Y(k). In general, the circuit 50 generates and stores all three possible target values of +1, −1 and 0 until the one correct target value is known. Once the correct target value is known, a multiplexer switch is used to designate the single correct value of the error signal Ye(k).

More specifically, referring to FIG. 5, the input signal is designated as Y(k−1) where the expression k−1 means one time period T earlier than time k. The signal Y(k−1) is represented by two differential voltage inputs Vpt and Vmt at input nodes 58 and 60. All three expressions of table 2 for the value of Ye(k) are generated by dc level shifting the Y(k−1) differential ac signal using resistor voltage shifters 62 and 64 each including series connected resistors R1, R2, R3 and current source Iset. The resistors and the current source Iset are adjusted so that Iset*(R1+R2+R3)=1. This sets the class IV partial response target values of +1 and −1.

Figure 8A:
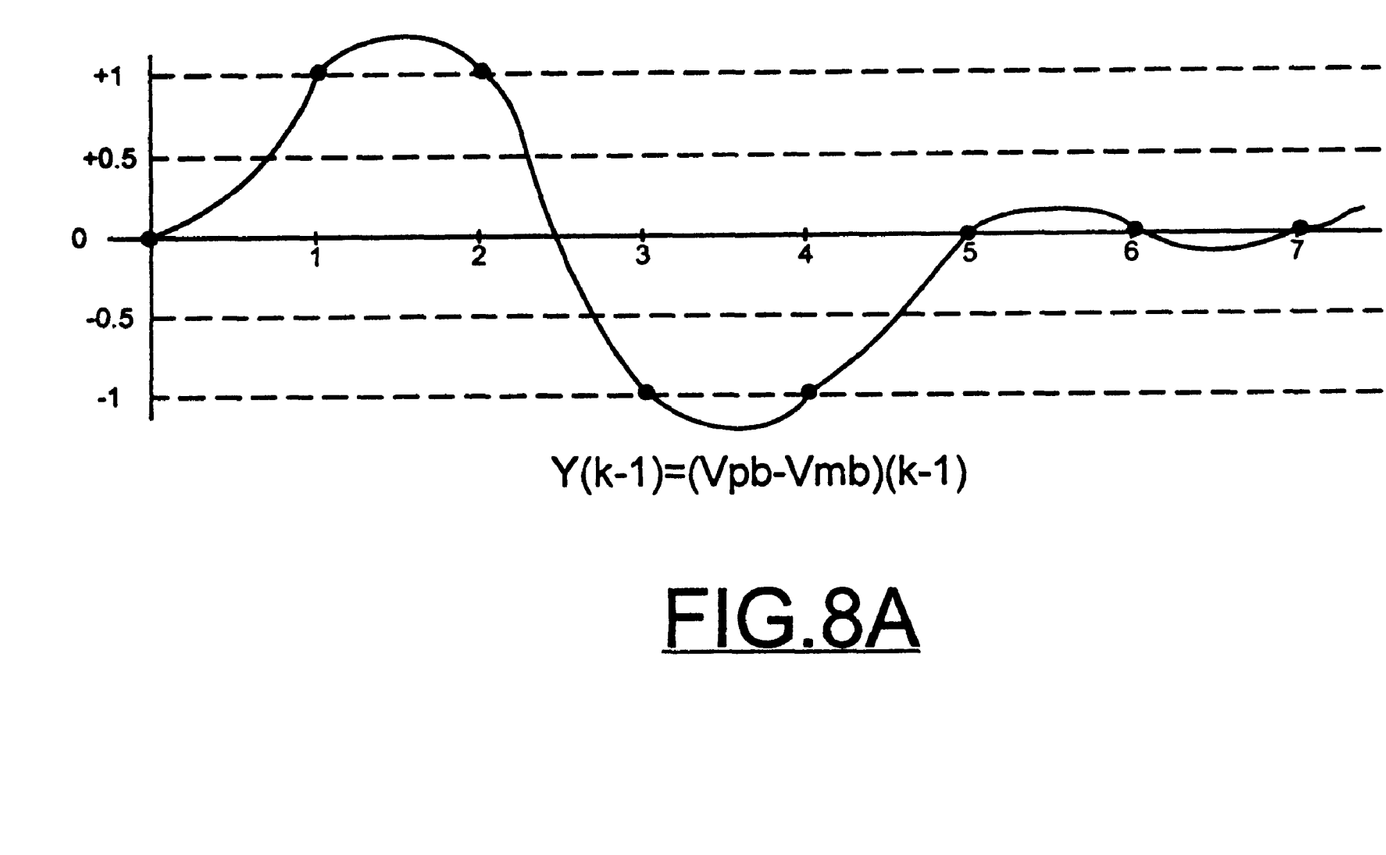
FIGS. 8A, 8B and 8C show three differential waveforms that are generated and held by the signal error generating circuit of FIG. 5.
Figure 8B:
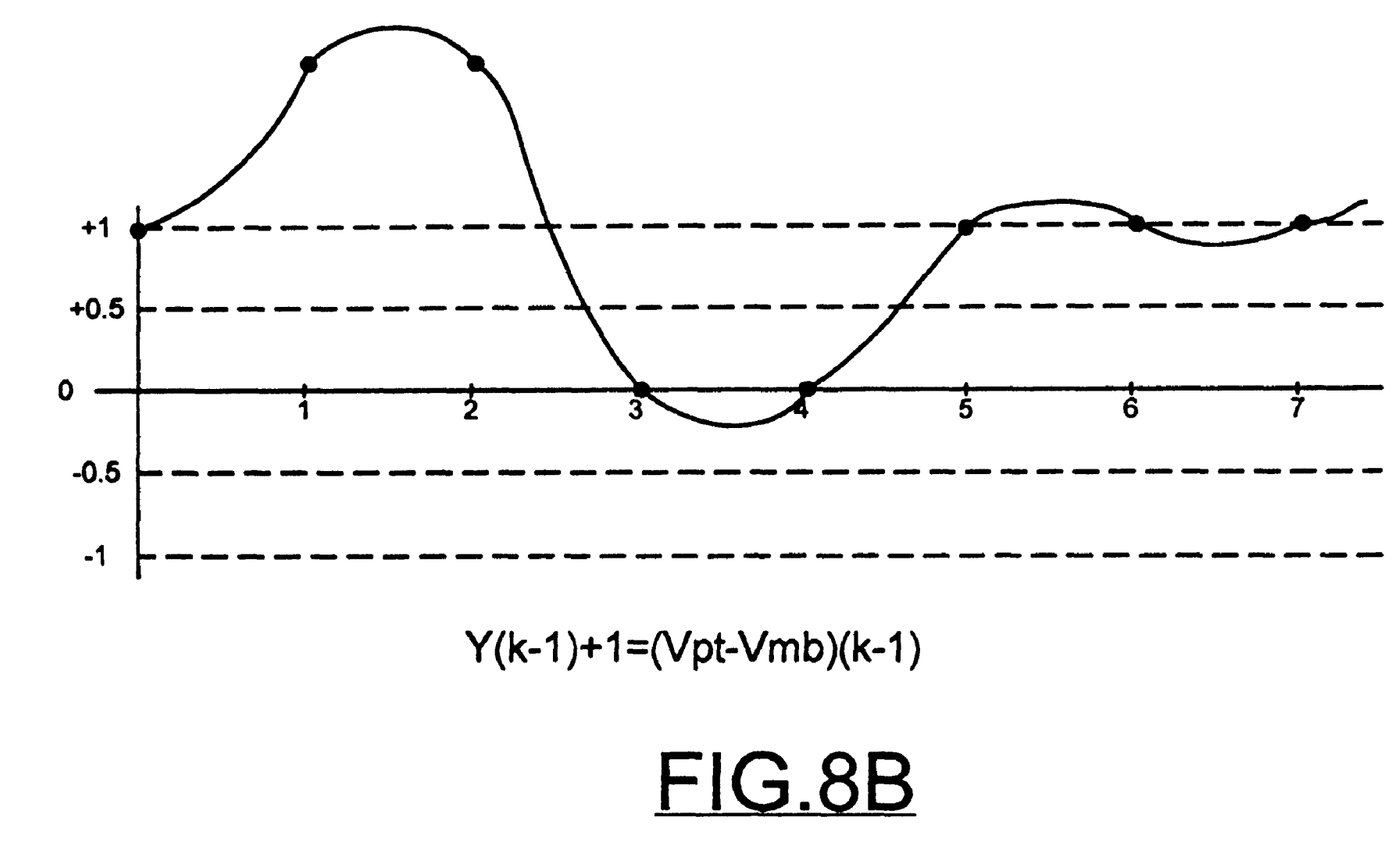
Figure 8C:
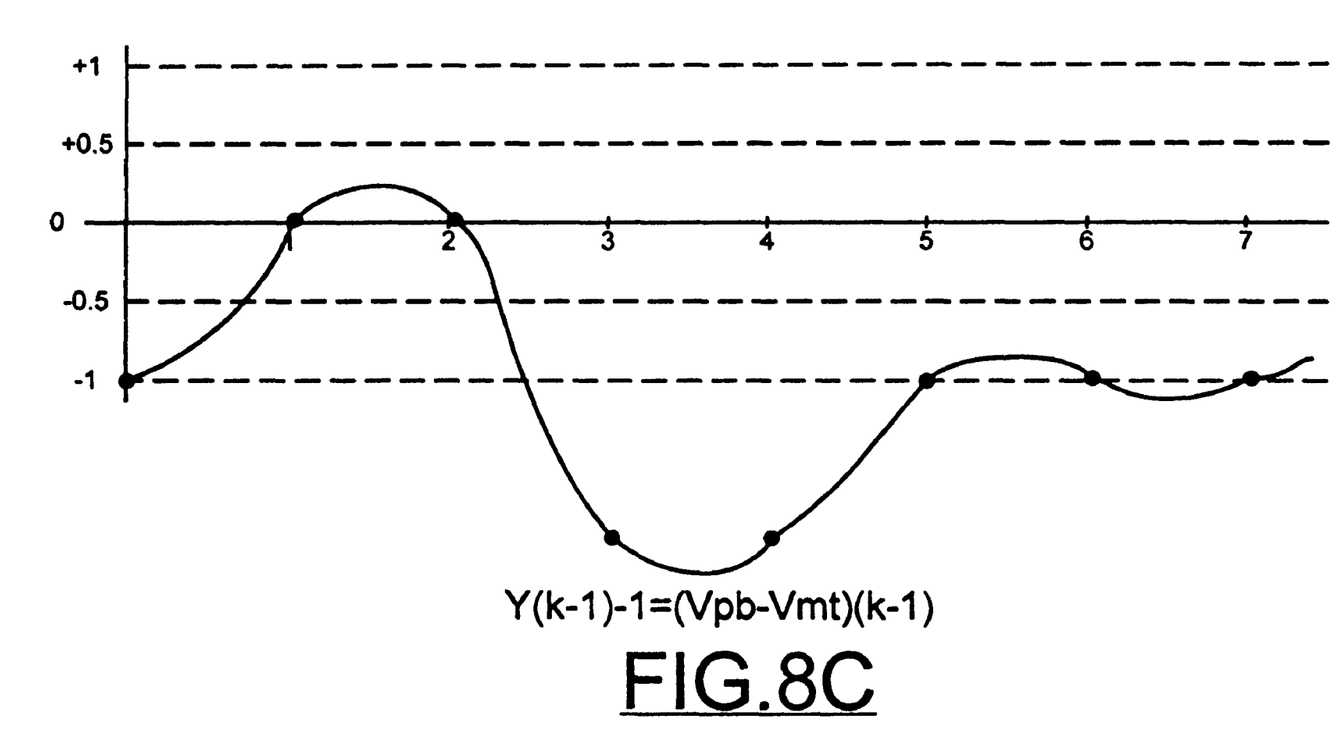

FIGS. 8A, 8B and 8C show the three differential waveforms produced by the four voltage nodes designated in FIG. 5 as Vpt, Vpb, Vmt and Vmb at time (k−1). In FIG. 8A, the waveform is obtained at nodes Vpb and Vmb and provides the error signal Ye(k−1) when the target value Ÿ(k−1) is 0. In FIG. 8B, the waveform is obtained at nodes Vpt and Vmb and provides the error signal Ye(k−1) when the target value Ÿ(k) is −1. In FIG. 8C, the waveform is obtained at nodes Vpb and Vmt and provides the error signal Ye(k−1) when the target value Ÿ(k) is +1. All four voltage nodes are sampled and held in a pair of sample and hold multiplexer circuits 66 and 68 designated as circuits A and B. The four node outputs are thus preserved to retain the information needed to generate the error signal Ye(k−1) at the later time when the target value is known.

As seen in FIG. 5, the target value Ÿ(k) is determined from four nodes in the voltage dividers 62 and 64 designated Vcpb, Vcmt, Vcmb and Vcpt. The voltages at these nodes are supplied to a detector circuit 69 including a pair of comparators 70 and 72. Comparator 70 is a +1 comparator that gives an output value of +1 if Y(k−1) is greater than +0.5. In this case Ÿ(k) is +1. Comparator 72 is a −1 comparator that gives an output value of −1 if Y(k−1) is less than −0.5. In this case Ÿ(k) is −1. If Y(k−1) is between −0.5 and +0.5, then the outputs of both comparators 70 and 72 are 0 and Ÿ(k) is 0.

Figure 9A:
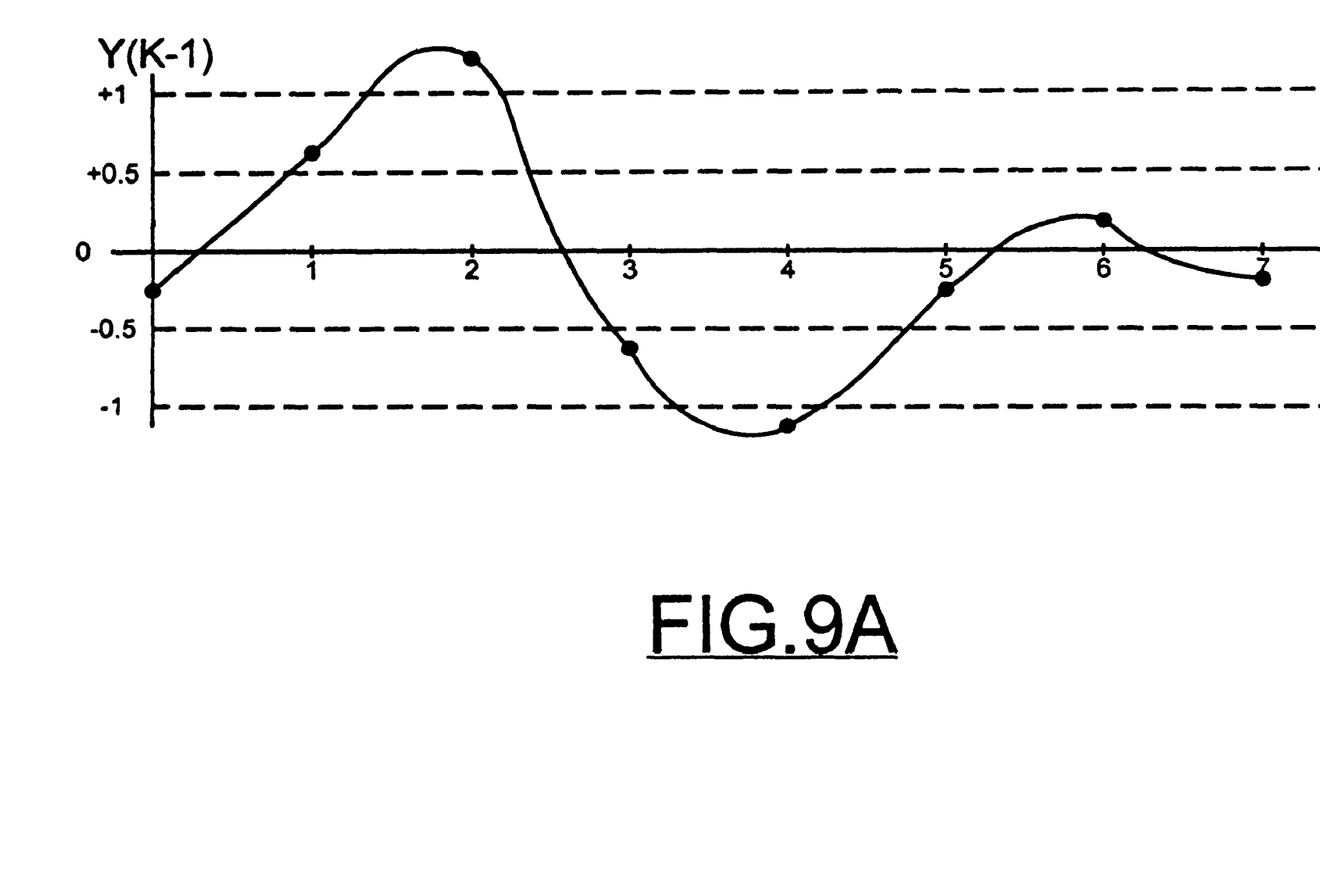
FIGS. 9A and 9B respectively show an input ac waveform and the class IV partial response target values determined from the input waveform by the signal error generating circuit of FIG. 5.
Figure 9B:
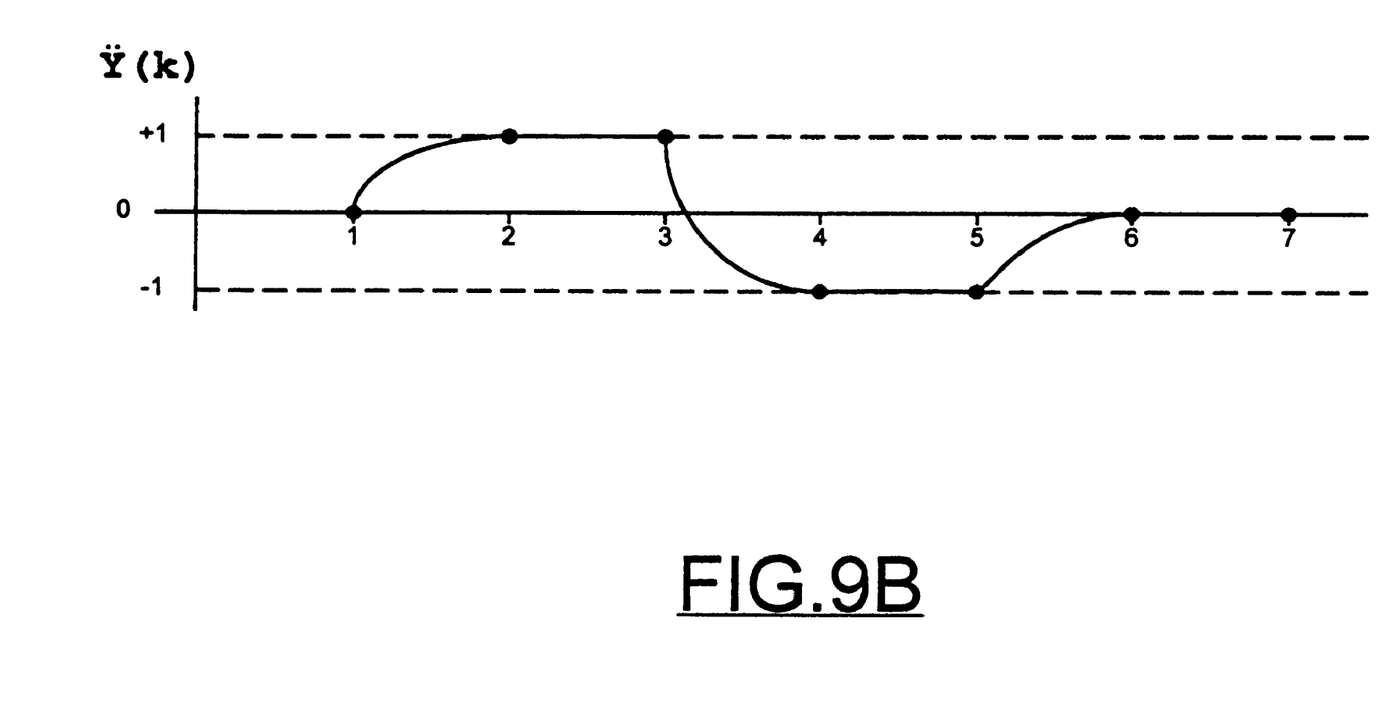

FIGS. 9A and 9B show the waveform Ÿ(k) (FIG. 9B) that is derived by the circuit of FIG. 5 from the input waveform Y(k−1) (FIG. 9A). Each value of Ÿ(k) is determined by the comparators 70 and 72 from the value of the input signal at the sequentially next earlier time k−1. Thus, for example, at time k=3 in FIG. 9A the value of Y(k−1) is less than −0.5 and as a result at time k=4 in FIG. 9B the value of Ÿ(k) is −1. The target voltage signal Ÿ(k) has three possible values and can be represented as a two bit digital signal. As seen in FIG. 4, this signal may be outputted for further use or processing, and is also passed to the gain and timing error circuit 52.

The voltages at the four nodes Vpt, Vmt, Vpb and Vmb are alternately sampled and held by the circuits 66 and 68. Clock pulses from the VCO 46 (FIG. 4) establish the sampling instances occurring at times k=1, 2, 3 . . . . At each successive clock pulse, one circuit 66 or 68 is switched to the sampling mode while the other is in the hold mode. At the next clock pulse, each sample and hold circuit is switched to the alternate mode. Thus while sample and hold A 66 is holding, sample and hold B 68 is sampling and conversely when sample and hold A 66 is sampling, sample and hold B 68 is holding.

The signal error generating circuit 50 of FIG. 5 includes an array 74 of switches for selectively interconnecting sampled and held voltages from the sample and hold circuits 66 and 68 to a pair of output nodes 76 and 78. The switches 74 are operated in order to pass the error signal Ye(k) to the output nodes 76 and 78. Switch SMT-A passes the voltage held in circuit 66 from node Vmt and switch SMT-B passes the voltage held in circuit 68 from node Vmt. Switch SPT-A passes the voltage held in circuit 66 from node Vpt and switch SPT-B passes the voltage held in circuit 68 from node Vpt. Switch SPB-A passes the voltage held in circuit 66 from node Vpb and switch SPB-B passes the voltage held in circuit 68 from node Vpb. Switch SMB-A passes the voltage held in circuit 66 from node Vmb and switch SMB-B passes the voltage held in circuit 68 from node Vmb.

At each clock pulse (i.e. each time k=1, 2, 3 . . . ) a pair of the switches of the array 74 is closed under the control of a clock synchronized control circuit 79 to transfer two held voltage values to the output as the error signal Ye(k). Circuit 79 is preferably a latched zone decode and relay select logic circuit that both controls the operation of the switch array 74 and also outputs the digital target value circuit Ÿ(k) with a two clock pulse delay as described below in connection with FIG. 6. The pair of switches to be closed at each clock pulse is selected by circuit 79 from the sample and hold circuit 66 or 68 that is in the holding mode at that time. The pair of switches is selected based upon the value of Ÿ(k) at that time. The following table 4 shows the manner in which a pair of switches is selected and closed at each clock pulse:

TABLE 4

| Ÿ (k) | Hold | Selected Switches |
|---|---|---|
| +1 | A | SPB-A and SMT-A |
| +1 | B | SPB-B AND SMT-B |
| 0 | A | SPB-A AND SMB-A |
| 0 | B | SPB-B AND SMB-B |
| −1 | A | SPT-A AND SMB-A |
| −1 | B | SPT-B AND SMB-B |

Figure 10:
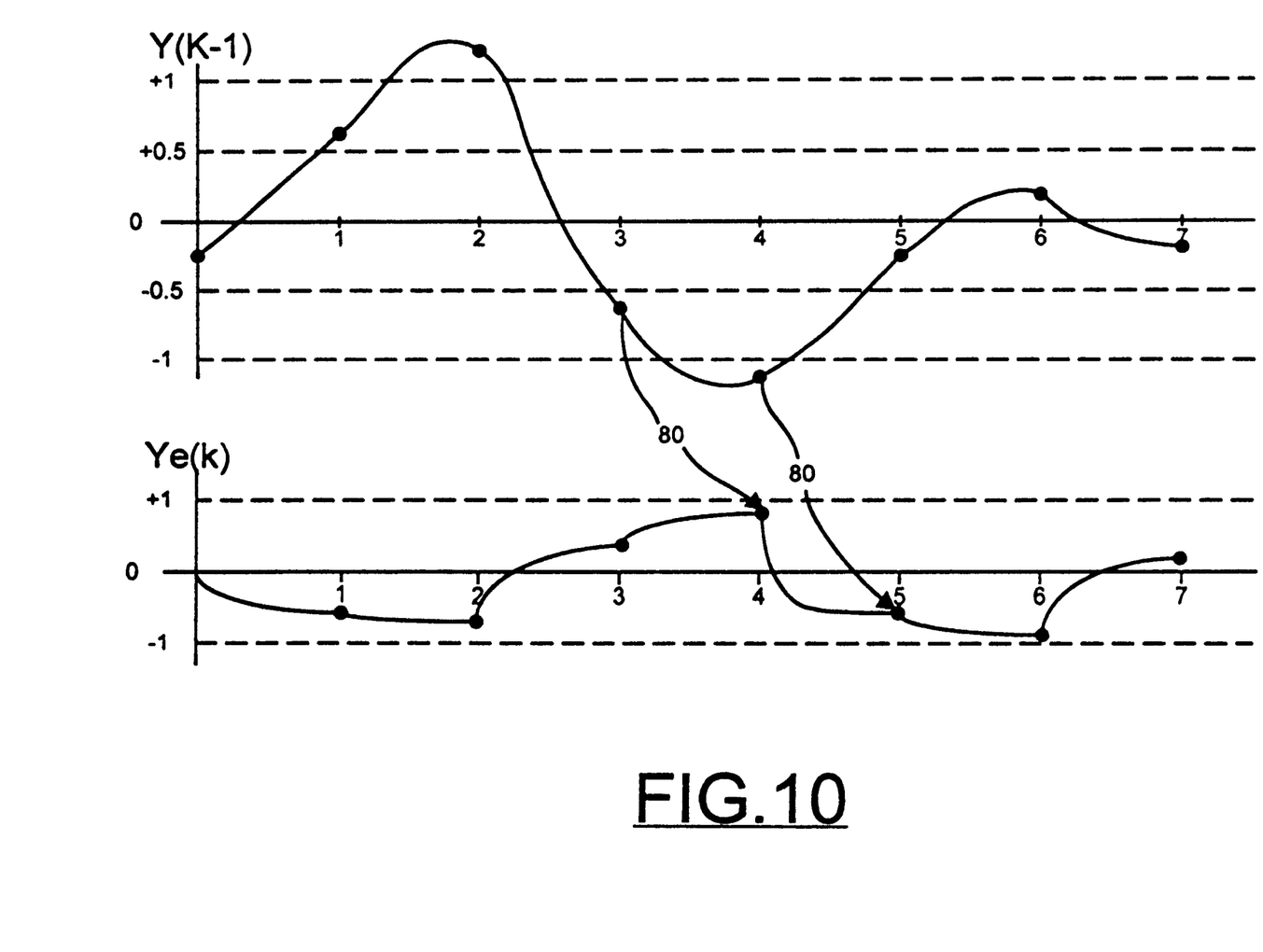
FIG. 10 shows the output error signal waveform provided by the signal error generating circuit of FIG. 5 from the input waveform.

Referring to FIG. 10, the upper wave form is the analog input signal Y(k−1) received at the input nodes 58 and 60 of the signal error generating circuit 50. The lower waveform is the output error signal waveform Ye(k) generated by the circuit 50. The arrows 80 indicate the k−1 time relationship between the input signal Y(k−1) and the output error signal Ye(k). The power of the error signal is one-third the power of the input analog signal, and the power required for signal processing is reduced accordingly. However the signal to noise ratio of the two waveforms is the same when Ye(k) is processed with Ÿ(k).

As seen in FIG. 4, the error signal Ye(k) is passed to the gain and timing error circuit 52. However, there are other ways in which the signals Ye(k) and Ÿ(k) could be used. Ye(k) could be converted to a digital signal using an analog to digital converter, and the power requirement would be one-third of what would be required if the input signal Y(k) were converted to a digital signal. Ye(k) could be used for data detection or timing and gain tracking or both using sampled analog techniques. In either case the signal processing power requirement is one-third of the requirement if the input signal Y(k) were used. This is a significant power saving. Another advantage is that the size of the circuit power supply can be reduced.

The gain and timing error circuit 52 seen in FIGS. 4 and 6 receives the error signal Ye(k) and the target value signal Ÿ(k) from the signal error generating circuit 50 and provides timing and gain feedback error signals Ge(t) and Te(t) for the VGA 40 and the VCO 46. Power requirements are reduced by processing the two error signals together, sharing information using analog sampling techniques. The preferred embodiment uses the two algorithms set forth below to generate timing and gain error signals in the tracking mode for PRML error detection, but the invention may be employed with other algorithms and in signal processing applications other than PRML.

In the preferred embodiment, the algorithm used to generate the gain error signal Ge(t) is $$Ge(t)=\ddot{Y}(k-2)*Ye(k-2)$$

where the expression k−2 means two time periods "T" earlier than time t. The algorithm used to generate the timing error signal Te(t) is $$Te(t)=\ddot{Y}(k-2)[Ye(k-1)-Ye(k-3)]$$

where the expressions k−1 and k−3 mean one and three time periods "T" before time t.

Referring to FIG. 6, the error signal Ye(k) is received from the output nodes 76 and 78 of the signal error generation circuit 50. As described above, this signal, seen in the lower waveform of FIG. 10, is the error voltage offset from the ideal PRML target voltages of +1, −1 and 0 (FIG. 9B). The target voltage signal is also applied to the circuit 52 from the circuit 50, delayed by two clock cycles, as Ÿ(k−2).

The circuit 52 includes four sample and hold multiplexer circuits 0–3 designated as 82, 84, 86 and 88. The input error signal Ye(k) is sampled and held each clock cycle by one of the sample and hold circuits 82–88. During any one clock cycle, one sample and hold circuit is sampling the input error signal, while the other three sample and hold circuits hold the three previously sampled signals Ye(k−1), Ye(k−2) and Ye(k−3). The outputs of the sample and hold circuits 82–88 are used to process the timing and gain error signals Te(t) and Ge(t). In the preferred embodiment the outputs of the sample and hold circuits 82–88 are currents that may be linearly added and subtracted as required by the Te(t) algorithm. A four step sequencer 90 is synchronized by clock pulses from the VCO 46 and sequences the sampling of the four sample and hold circuits 82–88. The sequencer 90 is clock synchronized and controls the selection of the particular held, previously sampled values to be used to develop the output error signals Ge(t) and Te(t).

The following table 5 provides a numerical example of the operation of the sample and hold circuits 82–88 as controlled by the sequencer 90 for an assumed error signal waveform defined in the second row of the table:

| k | 1 | 2 | 3 | 4 | 5 | 6 | 7 |
|---|---|---|---|---|---|---|---|
| Ye (k) | −0.32 | −0.47 | +0.2 | +0.4 | −0.3 | −0.45 | +0.2 |
| S/H 0 | Sampling | Ye (k-1) −0.32 | Ye (k-2) −0.32 | Ye (k-3) −0.32 | Sampling | Ye (k-1) −0.30 | Ye (k-2) −0.30 |
| S/H 1 | | Sampling | Ye (k-1) −0.47 | Ye (k-2) −0.47 | Ye (k-3) −0.47 | Sampling | Ye (k-1) −0.45 |
| S/H 2 | | | Sampling | Ye( k-1) +0.2 | Ye (k-2) +0.2 | Ye (k-3) +0.2 | Sampling |
| S/H 3 | | | | Sampling | Ye (k-1) +0.4 | Ye (k-2) +0.4 | Ye (k-3) +0.4 |
| Ÿ (k) | 0 | +1 | +1 | −1 | −1 | 0 | 0 |
| Ÿ (k-2) | | | | 0 | +1 | +1 | −1 | −1 |
| Ge (t) | | | 0 | −0.47 | +0.2 | −0.4 | +0.3 |
| Te (t) | | | | +0.52 | +.87 | +0.5 | +0.85 |

For example, when k=4 the sample and hold 0 circuit 82 (S/H 0) holds the value Ye(k−3)=−0.32, S/H 1 holds the value Ye(k−2)=−0.47, S/H 2 holds the value Ye(k−1)=+0.2 and S/H 3 is sampling the input signal Ye(k). Ge(t)=Ÿ(k−2)*Ye(k−2) has a value of −0.47 and Te(t)=Ÿ(k−2) [Ye(k−1)−Ye(k−3)] has a value of +0.52.

In the algorithms for the gain and timing error signals the value Ÿ(k−2) is a multiplier having a value of +1, −1 or 0 for each sample and hold on any given cycle. To multiply by one when Ÿ(k−2)=1, the signal out of the sample and hold is not changed. To multiply by −1 when Ÿ(k−2)=−1, the signal current output is simply reversed by a switch inside the sample and hold circuit. To multiply by zero when Ÿ(k−2)=0, the sample and hold current is shut off by a switch within the sample and hold circuit.

In the data channel of FIG. 4, the timing and error signals Te(t) and Ge(t) are integrated. For the example of table 5 at time k=4, Te(t) integrated would be positive and the VCO 46 is slowed. Ge(t) integrated indicates that the gain of the VGA 40 is too low and the gain will increase.

The sharing of the four sample and hold circuits for timing and gain error signals saves power. If separate processing circuits were used for the two error signals, then at least two additional sample and hold circuits would be needed.

As indicated above, further power savings of two-thirds is realized by using the error signal Ye(k) from the signal error generating circuit 50 rather than using the signal Y(k) directly. If the sample and hold circuits of FIG. 6 used the Y(t) signal, the sample and hold circuits would need to achieve linear operation for triple the signal amplitude.

Another advantage of using the Ye(k) error signal is that each sample and hold circuit 82–88 must match in dc offset within a given amplitude. When using the relatively smaller error signal Ye(t) rather than the larger Y(t) signal, gain mismatches are not as critical because large errors in timing and gain are non-linear but when timing and gain errors are close to the PR-IV target values of +1, −1 and 0, then only the offset is critical. This is because Ye(k) is nominally zero when the sampled values are at +1, −1 or 0. In comparison, if the sampled Y(t) signal were inputted directly into sample and hold circuits, not only would offset need to be calibrated for each sample and hold circuit, but also the gain for each sample and hold circuit would have to be linear for the entire, three times larger signal range.

Interleaving is allowed in class IV partial response maximum likelihood signal channels. In an interleaved system, odd time k signals and even time k signals are processed independently. The preferred embodiment disclosed here can be used with interleaved processing by using separate circuits for the two independent processing channels.

While the present invention has been described with reference to the details of the embodiments of the invention shown in the drawing, these details are not intended to limit the scope of the invention as claimed in the appended claims.

What is claimed is:

1. A signal error generating circuit for use in a data channel for processing an analog input signal approximating a series of discrete target values, said signal error generating circuit comprising:

an input connected to receive the analog input signal;

a voltage shifting circuit connected to said input for providing a plurality of shifted analog voltages by adding the discrete target values to the analog input signal;

a sampling circuit for periodically sampling said shifted analog voltages and then holding the resulting values;

a detector circuit for periodically developing from the analog input signal a representation of the target value most closely approximated by the analog input signal; and a control circuit for selecting from said sampling circuit the shifted analog voltage corresponding to said most closely approximated target value and for developing an output error signal equal to the deviation of said selected shifted analog voltage from said approximated target value.

2. The signal error generating circuit of claim 1, the data channel being a Partial Response Maximum Likelihood channel with target values of +1, −1 and 0, and said voltage shifting circuit providing said shifted analog voltages by adding +1, −1 and 0 respectively to the analog input signal.

3. The signal error generating circuit of claim 1, said sampling circuit including a plurality of sample and hold circuits operating in sequence with only one said sample and hold circuit sampling at one time.

4. The signal error generating circuit of claim 3, said sampling circuit inluding two sample and hold circuits alternately sampling said said shifted analog voltages.

5. The signal error generating circuit of claim 1, said voltage shifting circuit including at least one resistive voltage shifter connected to said input.

6. The signal error generating circuit of claim 1, said detector circuit including a plurality of comparators for comparing the analog input signal with the discrete target values.

7. A data storage disk file comprising:

a plurality of disks having magnetic surfaces containing data;

a plurality of transducer heads for reading data from said surfaces and providing an analog disk signal from data contained on said surfaces, the analog disk signal approximating a series of discrete target values;

motors for moving said disks and said heads to align said heads with regions of said surfaces where data is to be read;

a control unit for controlling components of the data storage disk file;

said control unit including a data channel for processing the analog disk signal;

said data channel including an error generating circuit including an input connected to receive the analog disk signal;

a voltage shifting circuit connected to said input for providing a plurality of shifted analog voltages by adding the discrete target values to the analog disk signal;

a sampling circuit for periodically sampling said shifted analog voltages and then holding the resulting values;

a detector circuit for periodically developing from the analog disk signal a representation of the target value most closely approximated by the analog disk signal; and a control circuit for selecting from said sampling circuit the shifted analog voltage corresponding to said most closely approximated target value and for developing an output error signal equal to the deviation of said selected shifted analog voltage from said approximated target value.

8. The data storage disk file of claim 7 wherein said data channel is a partial response maximum likelihood channel.

* * * * *